United States Patent [19]

James et al.

[11] Patent Number: 5,069,519
[45] Date of Patent: Dec. 3, 1991

[54] OPTICAL FIBRE HANDLING APPARATUS AND METHOD OF USING SAME

[75] Inventors: Simon M. James, Woodbridge; Roland W. Downing; Dominik Drouet, both of Ipswich, all of England

[73] Assignee: British Telecommunications public limited company, London, England

[21] Appl. No.: 543,754
[22] PCT Filed: Jan. 12, 1989
[86] PCT No.: PCT/GB89/00024
§ 371 Date: Jul. 16, 1990
§ 102(e) Date: Jul. 16, 1990
[87] PCT Pub. No.: WO89/06815
PCT Pub. Date: Jul. 27, 1989

[30] Foreign Application Priority Data

Jan. 13, 1988 [GB] United Kingdom ............. 8800666

[51] Int. Cl.$^5$ .......................... G02B 6/26; H01J 5/16
[52] U.S. Cl. ............................ 385/32; 250/227.11; 385/50; 385/25; 385/134
[58] Field of Search ............... 350/96.10, 96.11, 96.15, 350/96.12, 96.16, 96.17, 96.20, 96.21, 96.29, 320; 250/227.11, 227.14, 227.16, 231.19

[56] References Cited

U.S. PATENT DOCUMENTS

| 4,270,839 | 6/1981 | Cross | 350/96.15 |
| 4,586,783 | 5/1986 | Campbell et al. | 350/96.15 |
| 4,759,605 | 7/1988 | Shen et al. | 350/96.15 |
| 4,775,233 | 10/1988 | Kaneshi et al. | 350/96.15 X |
| 4,909,594 | 3/1990 | Haese et al. | 350/96.29 |
| 4,915,473 | 4/1990 | Haese et al. | 350/96.29 |
| 4,950,046 | 8/1990 | Hughes et al. | 350/96.15 X |
| 4,983,007 | 1/1991 | James et al. | 350/96.15 |
| 5,009,479 | 4/1991 | Morrison | 350/96.15 |
| 5,018,814 | 5/1991 | Jannson et al. | 350/96.15 |

FOREIGN PATENT DOCUMENTS

| 2841133 | 4/1980 | Fed. Rep. of Germany | 350/96.15 X |
| 3411272 | 10/1985 | Fed. Rep. of Germany | 350/96.15 X |
| 2040493 | 8/1980 | United Kingdom | 350/96.15 X |
| 2126749 | 3/1984 | United Kingdom | 350/96.15 X |
| 2158607 | 11/1985 | United Kingdom | 350/96.15 X |

Primary Examiner—Brian Healy
Attorney, Agent, or Firm—Nixon & Vanderhye

[57] ABSTRACT

Apparatus for handling an optical fibre (13) comprises a casing (1) defining a substantially light-proof enclosure surrounding an optical fibre operating position, and mechanical means (4 to 8) for picking up an optical fibre and transporting that optical fibre to the operating position. The operating position is defined by a secondary waveguide (2) which defines a curved optical waveguiding path. The mechanical means (4 to 8) is such as to position the optical fibre (13) in a curved position which at least substantially conforms to the inner side of the curved optical waveguiding, path whereby optical energy passing along the optical fibre is tapped into the curved waveguiding path.

22 Claims, 5 Drawing Sheets

OPTICAL FIBRE HANDLING APPARATUS AND METHOD OF USING SAME

BACKGROUND OF THE INVENTION

This invention relates to apparatus for handling optical fibres, and in particular to a mechanism that can pick up an optical fibre for subsequent testing purposes.

It is often necessary to test optical fibres to check whether optical energy is passing therethrough, or to measure the level of optical energy passing therethrough. Typically, such testing procedures are used in the maintenance of optical transmission paths and for fault finding. Known testing methods require a cleaved fibre end. This requirement entails not only disruption of the system, but it is time consuming and requires the use of special tools and a high level of skill by the operator.

Recently, a testing method has been proposed (see the specification of our copending U.K. patent application no. 8706929), corresponding to U.S. patent application Ser. No. 399,503, now U.S. Pat. No. 4,983,007, which utilises optical energy tapped from a curved portion of an optical fibre. In practice, tapping optical energy from a curved optical fibre requires the fibre to be handled very carefully, otherwise the fibre coating can be damaged, which would adversely affect the transmission characteristics of the fibre.

The aim of the invention is to provide optical fibre handling apparatus which handles optical fibres sufficiently gently to avoid damage thereto.

SUMMARY OF THE INVENTION

The present invention provides apparatus for handling an optical fibre, the apparatus comprising a casing defining a substantially light-proof enclosure surrounding an optical fibre operating position defined by a secondary waveguide, and mechanical means for picking up an optical fibre and transporting that optical fibre to the operating position, wherein the secondary waveguide defines a curved optical waveguiding path, and the mechanical means is such as to position the optical fibre in a curved position which at least substantially conforms to the inner side of the curved optical waveguiding path, whereby optical energy passing along the optical fibre is tapped into the curved optical waveguiding path.

Preferably, the secondary waveguide has a straight waveguiding portion at each end of the curved waveguiding path, each of the straight waveguiding portions leading to a transducer.

In a preferred embodiment the casing is of two-part construction, a first part of the casing being fixed and including the light-proof enclosure, and the second part of the casing being movable relative to the first casing part to permit insertion of the optical fibre. Advantageously, the mechanical means is housed in the second casing part, the mechanical means including a plunger and a pair of guide wheels, the plunger being reciprocable towards, and away from, the operating position. Preferably, the peripheral portions of the guide wheels are made of soft resilient material, the guide wheels being positioned symmetrically with respect to the direction of movement of the plunger and at such a spacing that, during movement of the plunger between the guide wheels, the guide wheels roll the optical fibre towards, or away from, the operating position in a tension-free manner. Conveniently, the plunger is provided with an operating lever which projects through, and is movable along, an elongate slot in the second casing part.

Advantageously, the mechanical means further comprises a pair of V-shaped jaws each of which is carried at one end of a respective arm, the other ends of the arms being fixed reciprocably to an operating bar, and the operating bar being reciprocably mounted for movement towards, and away from, the operating position. Preferably, the operating bar is spring biased towards the operating position. Conveniently, the V-shaped jaws carried by the arms are cooperable with complementary V-shaped jaws associated with the first casing part, the two sets of V-shaped jaws cooperating, in use, to grip the optical fibre lightly in such a manner as to permit the optical fibre to slide therebetween.

The plunger may be provided with stop means engageable with the operating bar for conjoint movement therewith.

Preferably, the second casing part defines curved guide slots for directing the optical fibre towards the guide wheels.

In another preferred embodiment, the apparatus further comprises a base plate provided with a groove, and the casing is provided with means for detachably locking the casing to the base plate so that the mechanical means is aligned with the groove. The base plate may be provided with a plurality of parallel grooves, the casing being detachably lockable to the base plate so that the mechanical means is aligned with any one of the grooves.

Advantageously, the mechanical means is constituted by a pair of mandrels, each of which is supported by an operating arm, the arrangement being such that the mandrels can be separated and lowered into the or a groove in the base plate beneath an optical fibre crossing that groove, after which the mandrels can be closed together underneath the fibre and then moved towards the operating position. Preferably, the adjacent edge portions of the mandrels are chamfered so as to define a V-shaped fibre-receiving groove when the mandrels are closed together.

Conveniently, the or each groove is associated with at least one set of latching posts, the or each set being constituted by two pairs of aligned latching posts and the two pairs of each set being positioned on opposite sides of the associated groove, the or each set of latching posts constituting optical fibre location means and being engageable in complementary sockets formed in the casing. The invention also provides a jointing enclosure comprising a fibre tray, a plurality of optical fibres, and optical fibre handling apparatus as defined above, wherein the base plate is fixed to the fibre tray beneath the optical fibres, with the or each groove transverse to the optical fibres.

BRIEF DESCRIPTION OF THE DRAWINGS

Three forms of optical fibre handling mechanism will now be described in greater detail, by way of example, with reference to the accompanying drawings, in which.

DETAILED DESCRIPTION OF THE INVENTION

Figure 1:
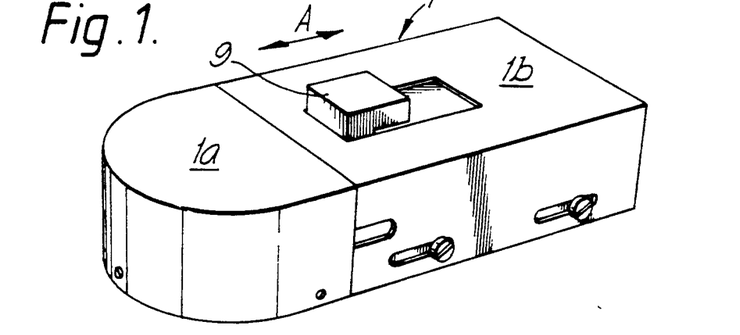
FIG. 1 is a perspective view of the first form of fibre handling mechanism, the mechanism being shown in an operating position.
Figure 2:
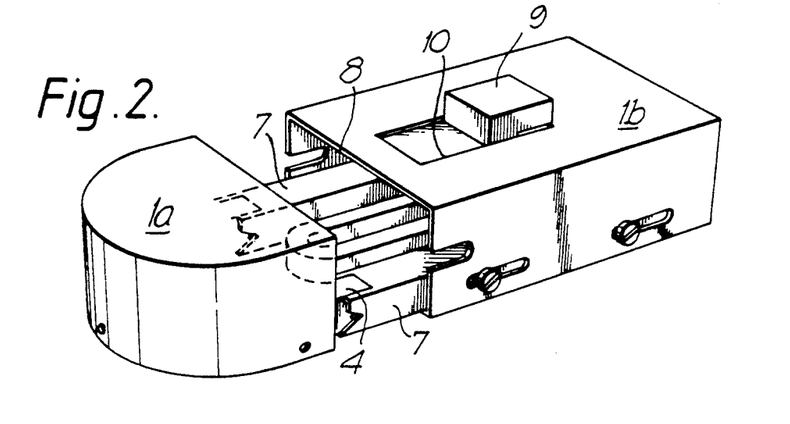
FIG. 2 is a perspective view similar to that of FIG. 1, but showing the first form of fibre handling mechanism in a non-operating position.

Referring to the drawings, FIG. 1 shows a first form of fibre handling mechanism, the mechanism having a substantially light-proof casing 1 of two-part costruction. The casing 1 has a first, fixed part 1a, and a second movable part 1b, the movable part being slidable towards, and away from, the fixed part as indicated by the double-headed arrow A. FIG. 2 shows the mechanism with the movable casing part 1b slid away from the fixed casing part 1a, so as to permit the insertion of an optical fibre in a manner to be described below. FIG. 1 shows the mechanism in the operating position, that is to say with the movable casing part 1b slid back against the fixed casing part 1a, and with the optical fibre held within the mechanism.

Figure 3:
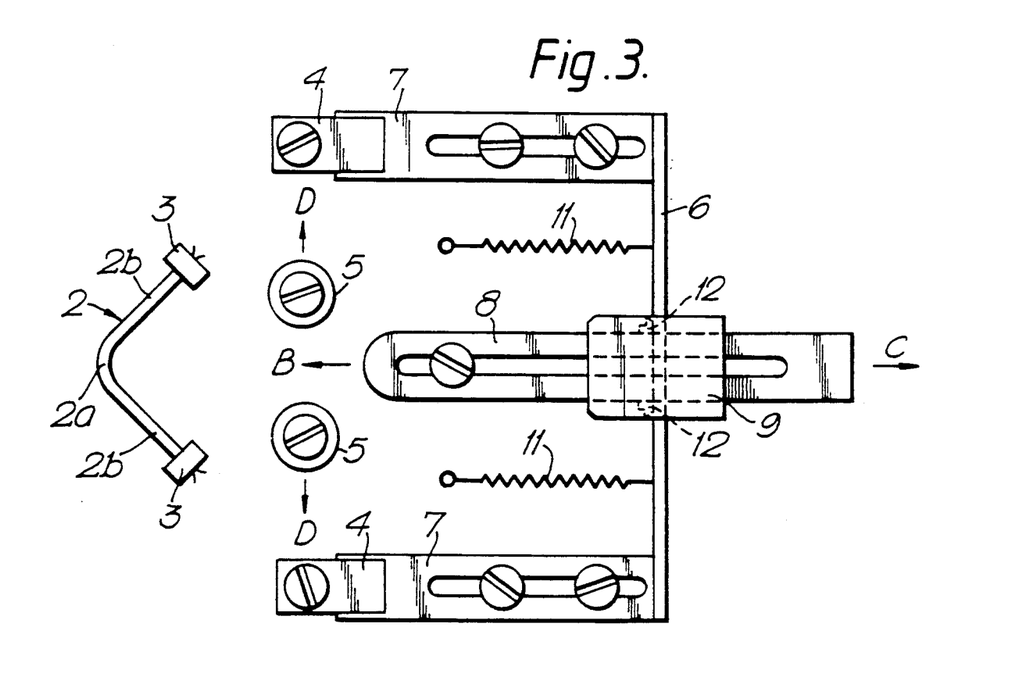
FIG. 3 is a plan view of the internal working parts of the mechanism of FIGS. 1 and 2.

FIG. 3 shows the internal working parts of the mechanism of FIGS. 1 and 2. The casing part 1a houses a secondary waveguide 2 and a pair of detectors 3. The secondary waveguide 2 is a silica rod having a curved portion 2a and two straight portions 2b. The detectors 3 are large area germanium photodiodes. Together, the secondary waveguide 2 and the detectors 3 form part of an optical coupling device of the type described in the specification of our copending patent application no. 8706929, the contents of which are incorporated herein by way of reference. The casing part 1a also houses a pair of fixed locators 4 made of polytetrafluorethylene, and a pair of spring-loaded rubber-faced guide wheels 5. The locators 4 each carry a V-shaped jaw 4a.

The casing part 1b houses a sliding plunger assembly including an operating bar 6 which carries a pair of sliding locators 7 made of polytetrafluorethylene. The operating bar 6 is mounted within the casing part 1b, and the locators 7 each carry a V-shaped jaw 7a. A brass sliding plunger 8 is slidably mounted on the operating bar 6 for movement in the directions of the arrows B and C. An operating lever 9 is fixed to the plunger 8, the operating lever projecting through, and being slidably relative to, an aperture 10 formed in the top surface of the casing part 1b (see FIGS. 1 and 2). Movement of the operating bar 6 in the direction of the arrow C is restrained by a pair of expansion springs 11 connected between the operating bar and the casing part 1b. A pair of pins 12 are screwed into the operating lever 9, the pins cooperating with the operating bar 6 in a manner described below.

Figure 4:
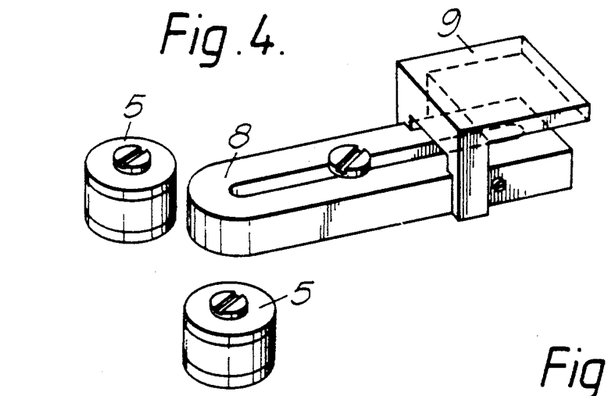
FIG. 4 is an enlarged perspective view of the part of the internal workings shown in FIG. 3.
Figure 5:
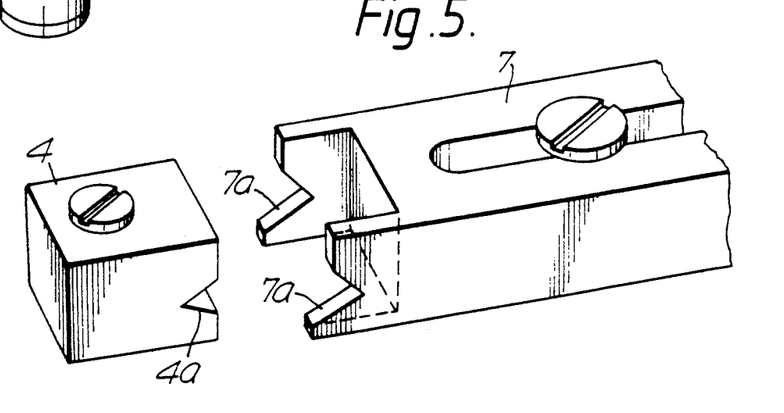
FIG. 5 is an enlarged perspective view of another part of the internal workings shown in FIG. 3.
Figure 6:
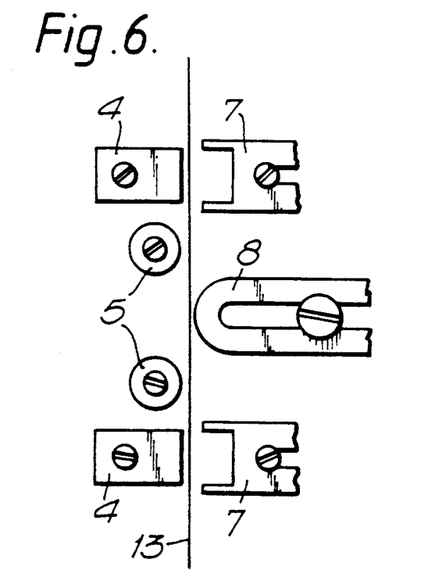
FIG. 6 is a plan view of the internal workings of FIG. 3, and shows an optical fibre in a first operating position.

In use, an optical fibre is loaded into the mechanism in the following manner. Firstly, the operating lever 9 is pulled in the direction C (see FIG. 3) such that the pins 12 contact the operating bar 6. As the sliding plunger 8 (see FIG. 4) is pulled further in the direction C by the lever 9, the operating bar 6 pulls against the expansion springs 11, and the jaws 7a of the sliding locators 7 move away from the jaws 4a of the fixed locators 4, thereby opening V-shaped grooves for receiving a primary coated optical fibre 13 (see FIG. 6). Once the fibre 13 has been inserted, the plunger 8 is then allowed to slide in the direction B under spring tension, thereby locating the fibre 13 in the double interlocking V-shaped grooves. The design of the V-shaped grooves is such that the fibre 13 is not gripped tightly, and can still slide once the V-shaped grooves have shut.

Figure 7:
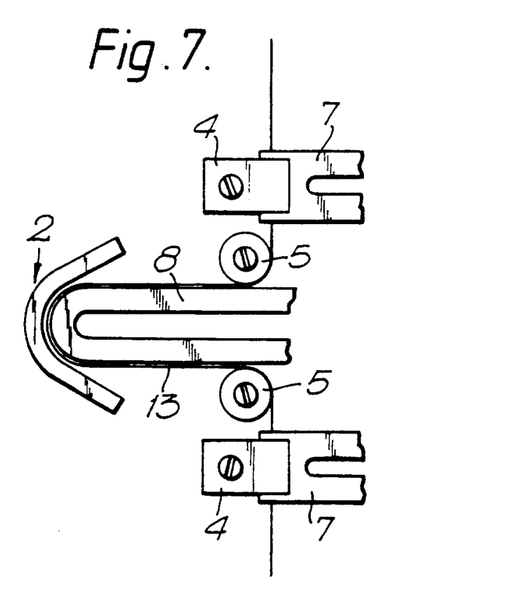
FIG. 7 is a plan view similar to that of FIG. 6, but showing the optical fibre in a second operating position.

The plunger 8 is then pushed in the direction B, by means of the lever 9, so as to contact the fibre 13. As the plunger 8 is pushed further, it contacts the spring-loaded guide wheels, these wheels being spring loaded in the directions D shown in FIG. 3. As the plunger 8 passes through the guide wheels 5, the wheels deflect and press the fibre 13 against the sides of the plunger. The guide wheels 5 have the effect of rolling the fibre 13 in the direction B, such that the fibre is not placed under tension during the locating process. The plunger 8 eventually reaches the limit of its travel in the direction B, at which point the fibre 13 is in physical contact with the secondary guide 2. The fibre 13 is then located as shown in FIG. 7, and the casing parts 1a and 1b are in the positions shown in FIG. 1.

In this position, the coupling device can tap out optical energy passing along the fibre 13 in either direction. Such tapped-out optical energy is useful for maintenance purposes or for fault-finding. It can also be used to measure the power of the optical energy passing along the fibre 13. In this case, the mechanism could incorporate the electronic module of the optical power meter described in the specification of our pending International patent application PCT/GB89/00033, the contents of which are incorporated herein by way of reference.

Removal of the fibre 13 from the mechanism is the reverse of the locating process described above. The plunger 8 is pulled in the direction of the arrow C by the operating lever 9, and the guide wheels 5 roll the fibre 13 back out through the double V-shaped grooves 4a and 7a.

The diameter of the guide wheels 5 is important in determining the insertion loss of the device (i.e. the difference between the input and output optical powers in the fibre). These wheels 5 should be large, so that the portion of insertion loss attributable to them is small.

Figure 8:
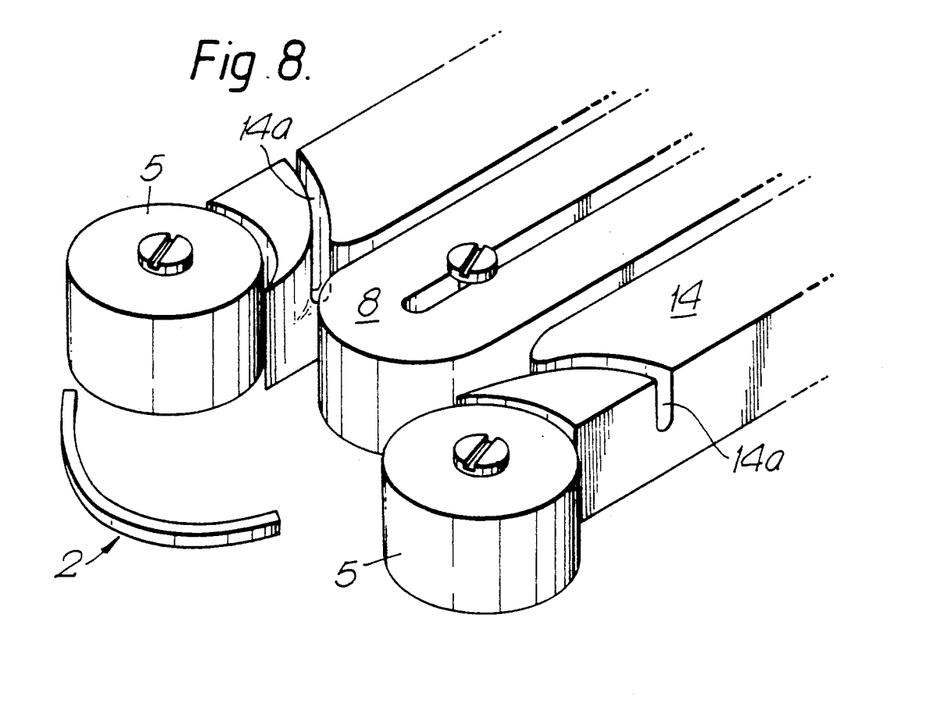
FIG. 8 is a perspective view of part of the internal workings of the second form of fibre handling mechanism.

FIG. 8 shows a modified version of the embodiment of FIGS. 1 to 7, the FIG. 8 embodiment being a design which has a reduced insertion loss. Thus, the fibre handling mechanism of FIG. 8 retains the principle of the sliding plunger and guide wheels, but attempts to minimise the component of insertion loss attributable to the mechanism. In this mechanism the guide wheels 5 are of a larger diameter than those of the mechanism of FIGS.

1 to 7, whilst the fibre (not shown) is initially located in slots 14a cut in a base plate 14 housed in the mechanism. These slots 14a will typically have a radius of 30 mm or more.

The embodiments of FIGS. 1 to 8 are designed for general use, that is to say they are "clip-on" devices that can be used anywhere access can be gained to an optical fibre. They are not, however, easy to use with optical fibres at jointing enclosures and distribution points.

Figure 9:
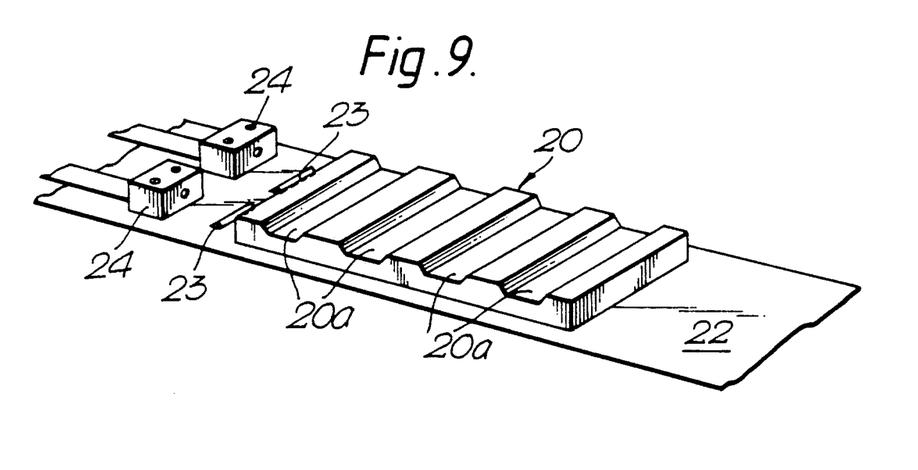
FIG. 9 is a perspective view of a fibre tray and a fibre organising base plate which forms part of the third form of fibre handling mechanism.
Figure 10:
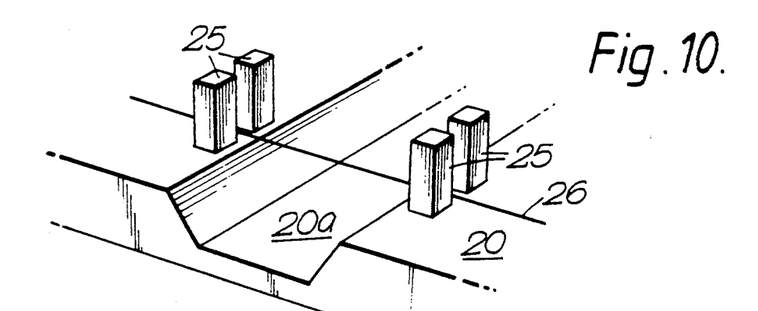
FIG. 10 is an enlarged perpective view of part of the fibre organising base plate of FIG. 9.

FIGS. 9 to 12 show a fibre handling mechanism that can be incorporated into a jointing enclosure or a distribution point. This mechanism includes a fibre organising base plate 20 and a "clip-on" main body 21 (see FIG. 11). The base plate 20 (see FIG. 9) will be a permanent attachment in the jointing enclosure or distribution point. Thus, as shown in FIG. 9, the base plate 20 is fixed to the fibre tray 22 of a jointing enclosure adjacent to its fanning strips 23. The fanning strips 23 fan out the optical fibres (not shown in FIG. 9) which emerge from the cable butts 24 of the jointing enclosure. The base plate 20 has four trapezoidal-shaped, transverse (with respect to the fibres) grooves 20a. Pairs of latching posts 25 (see FIGS. 10 and 11) are positioned on opposite sides of each groove 20a, these latching posts not being shown in FIG. 9 for reasons of clarity. Each pair of latching posts 25 is aligned with a corresponding pair of latching posts on the opposite side of the adjacent groove 20a, so that an optical fibre 26 can pass between the posts of each set of aligned pairs of latching posts. The sets of aligned pairs of latching posts 25 are staggered along the rows of grooves 20a so that adjacent optical fibres do not pass through adjacent sets of aligned pairs of latching posts associated with the same groove. The main body 21 of the mechanism (see FIGS. 11 and 12) includes a secondary waveguide 27 similar to the secondary waveguide of the embodiment of FIGS. 1 to 7. A pair of detectors (not shown, but similar to the detectors 3) are associated with the secondary waveguide 27. The main body 21 also houses a split mandrel arrangement which is constituted by a pair of mandrels 28, each of which is supported by a respective arm 29. The main body 21 is provided with sockets (not shown) for receiving the latching posts 25 when the main body is seated on the base plate 20. In this position, the fibre 26 is positioned in a groove 21a formed in the base of the main body 21. Once correctly seated, the main body 21 is locked in position by means of a locking mechanism (not shown) activated by a button 30.

Figure 11:
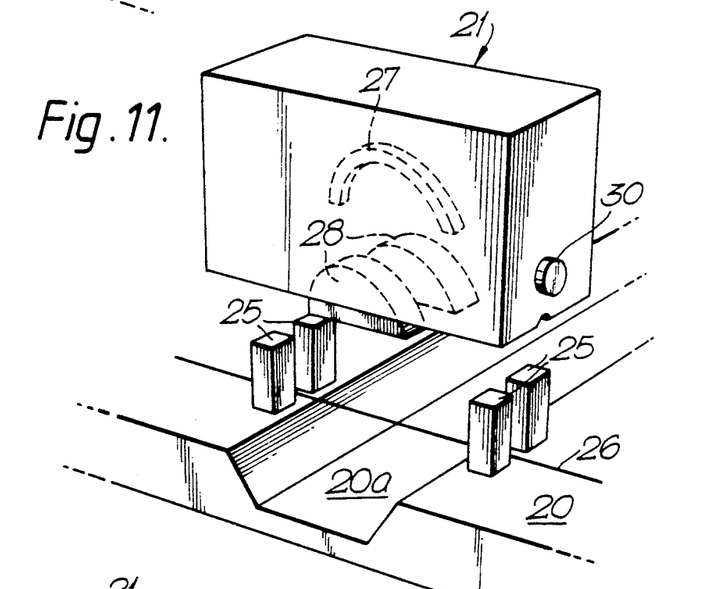
FIG. 11 is an enlarged perpective view similar to that of FIG. 10, but showing additionally the main body of the third form of fibre handling mechanism.
Figure 12:
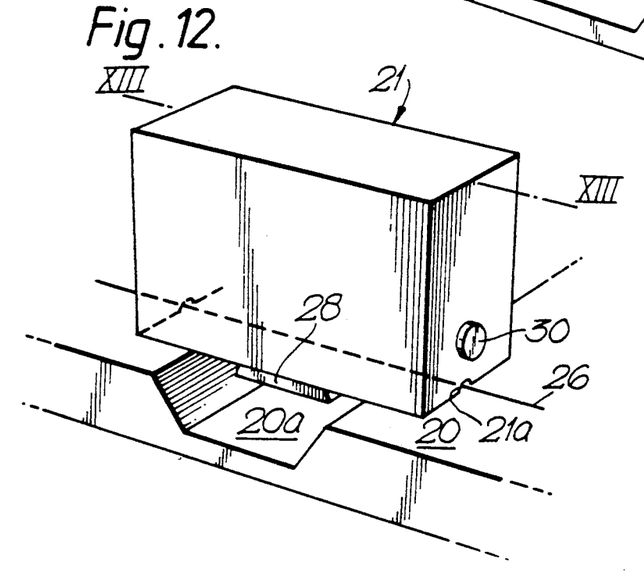
FIG. 12 is a view similar to that of FIG. 11, but showing the main body in its operating position.

When a test is to be performed on a given fibre 26, the main body 21 is located onto the associated pairs of latching posts 25 (as shown in FIG. 11). The posts 25 are so arranged that the main body 21 is guided towards the fibre 26 long before the mandrels 28 approach the fibre, hence minimising the risk of fibre damage. The latching posts 25 locate within the sockets in the main body 21 so that the main body is mechanically locked onto the base plate 20, and can only be removed by depressing the button 30 on the side of the main body. Once locked, the main body 21 sits on top of the base plate 20 as shown in FIG. 12.

Figure 13A:
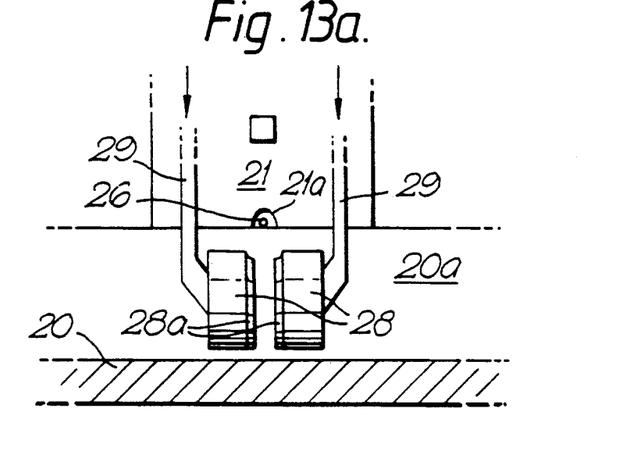
FIGS. 13a to 13c are schematic cross-sections taken on the line XIII—XIII of FIG. 12, and showing various stages in the fibre handling process.

To draw the fibre 26 into contact with the secondary guide 27, an operating lever (not shown) on the main body 21 is operated. This lever performs the following sequence of operations:

(i) The mandrels 28 go down into the bottom of the groove 20a in the base plate 20 (see FIG. 13a).

Figure 13B:
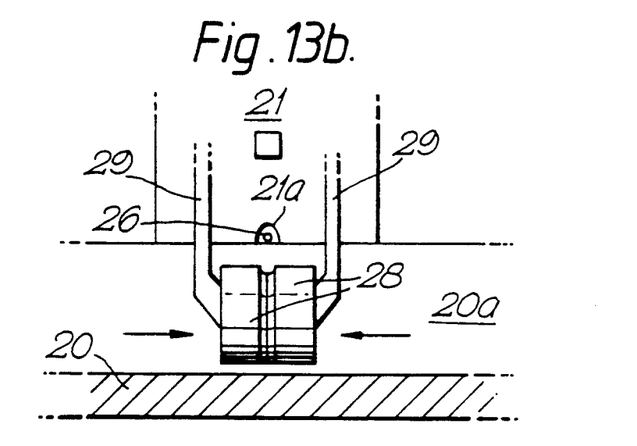

(ii) The mandrels 28 then close underneath the fibre 26, in preparation for lifting the fibre into the main body 21 (see FIG. 13b).

Figure 13C:
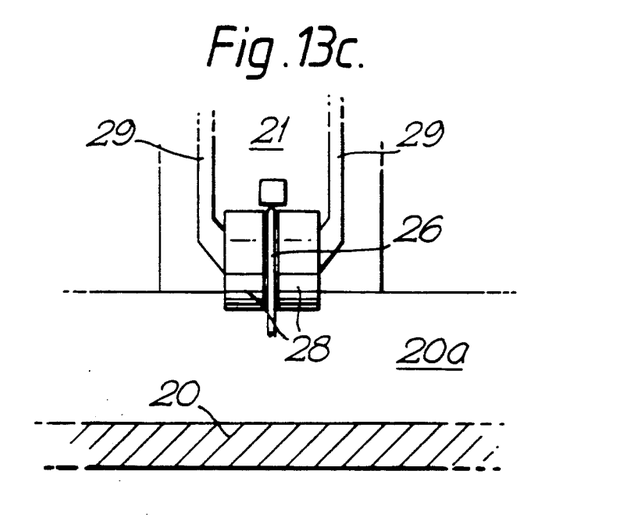

(iii) The mandrels 28 then lift the fibre 26 into the main body 21 to contact the secondary waveguide 27 (see FIG. 13c).

The mandrels 28 have chamfered edges 28a so forming a locating V-shaped groove when they close.

The process of loading the fibre 26 into the main body 21 is purely mechanical, and does not entail any manual handling of the primary coated fibre. At the end of testing, the operating lever is released, and the sequence of operations to unload the fibre 26 is the reverse of the loading process. The main body 21 is then released from the base plate 20 by depressing the button 30.

During the loading process, some additional spare fibre is required. If the bend radius of the secondary waveguide 27 is 11 mm, then approximately 13 mm of additional fibre is required. This spare fibre might be typically located in a drum arrangement (not shown). This drum would be placed on the fibre tray 22 adjacent to the base plate 20. A number of drums would be required to deal with the fibres in a large cable. Alternatively, the necessary spare fibre may be drawn from the normal slack/spare fibre found in jointing enclosures.

Each of the fibre handling mechanisms described above is capable of picking up an optical fibre and positioning it gently and accurately against a secondary waveguide, so that optical energy can be tapped out of the fibre for use in the maintenance of an optical fibre system, for fault finding, or for measuring power levels in optical fibres. Moreover, each of the mechanisms has a substantially light-proof enclosure housing its secondary waveguide when that mechanism is in use, so that ambient light does not reach the detection system. Each of the mechanisms is also easy to use by non-skilled personnel, and so can be used in the field.

We claim:

1. Apparatus for handling an optical fibre, the apparatus comprising a casing defining a substantially light-proof enclosure surrounding an optical fibre operating position defined by a secondary waveguide, and mechanical means for picking up an optical fibre and transporting that optical fibre to the operating position, wherein the secondary waveguide defines a curved optical waveguiding path, and the mechanical means is such as to position the optical fibre in a curved position which at least substantially conforms to the inner side of the curved optical waveguiding path, whereby optical energy passing along the optical fibre is tapped into the curved optical waveguiding path.

2. Apparatus for handling an optical fibre, the apparatus comprising a casing defining a substantially light-proof enclosure surrounding an optical fibre operating position defined by a secondary waveguide, and mechanical means for picking up an optical fibre and transporting that optical fibre to the operating position, wherein the secondary waveguide defines a curved optical waveguiding path, and the mechanical means is such as to position the optical fibre in a curved position which at least substantially conforms to the inner side of the curved optical waveguiding path, whereby optical energy passing along the optical fibre is tapped into the curved optical waveguiding path, wherein the secondary waveguide has a straight waveguiding portion at each end of the curved waveguiding path, each of the straight waveguiding portions leading to a transducer.

3. Apparatus as claimed in claim 1, wherein the casing is of two-part construction, a first part of the casing being fixed and including the light-proof enclosure, and the second part of the casing being movable relative to the first casing part to permit insertion of the optical fibre.

4. Apparatus for handling an optical fibre, the apparatus comprising a casing defining a substantially light-proof enclosure surrounding an optical fibre operating position defined by a secondary waveguide, and mechanical means for picking up an optical fibre and transporting that optical fibre to the operating position, wherein the secondary waveguide defines a curved optical waveguiding path, and the mechanical means is such as to position the optical fibre in a curved position which at least substantially conforms to the inner side of the curved optical waveguiding path, whereby optical energy passing along the optical fibre is tapped into the curved optical waveguiding path, wherein the casing is of two-part construction, a first part of the casing being fixed and including the light-proof enclosure, and the second part of the casing being movable relative to the first casing part to permit insertion of the optical fibre, wherein the mechanical means is housed in the second casing part, the mechanical means including a plunger and a pair of guide wheels, the plunger being reciprocable towards, and away from, the operating position.

5. Apparatus as claimed in claim 4, wherein the peripheral portions of the guide wheels are made of soft resilient material, the guide wheels being positioned symmetrically with respect to the direction of movement of the plunger and at such a spacing that, during movement of the plunger between the guide wheels, the guide wheels roll the optical fibre towards, or away from, the operating position in a tension-free manner.

6. Apparatus as claimed in claim 4, wherein the plunger is provided with an operating lever which projects through, and is movable along, an elongate slot in the second casing part.

7. Apparatus as claimed in claim 4, wherein the mechanical means further comprises a pair of V-shaped jaws each of which is carried at one end of a respective arm, the other ends of the arms being fixed to an operating bar, and the operating bar being reciprocably mounted for movement towards, and away from, the operating position.

8. Apparatus as claimed in claim 7, wherein the operating bar is spring biased towards the operating position.

9. Apparatus as claimed in claim 7, wherein the V-shaped jaws carried by the arms are cooperable with complementary V-shaped jaws associated with the first casing part, the two sets of V-shaped jaws cooperating, in use, to grip the optical fibre lightly in such a manner as to permit the optical fibre to slide therebetween.

10. Apparatus as claimed in claim 7, wherein the plunger is provided with stop means engageable with the operating bar for conjoint movement therewith.

11. Apparatus as claimed in claim 4, wherein the second casing part defines curved guide slots for directing the optical fibre towards the guide wheels.

12. Apparatus as claimed in claim 1 further comprising a base plate provided with a groove, and the casing is provided with means for detachably locking the casing to the base plate so that the mechanical means is aligned with the groove.

13. Apparatus as claimed in claim 12, wherein the base plate is provided with a plurality of parallel grooves, the casing being detachably lockable to the base plate so that the mechanical means is aligned with any one of the grooves.

14. Apparatus as claimed in claim 12, wherein the mechanical means is constituted by a pair of mandrels, each of which is supported by an operating arm, the arrangement being such that the mandrels can be separated and lowered into the or a groove in the base plate beneath an optical fibre crossing that groove, after which the mandrels can be closed together underneath the fibre and then moved towards the operating position.

15. Apparatus as claimed in claim 14, wherein the adjacent edge portions of the mandrels are chamfered so as to define a V-shaped fibre-receiving groove when the mandrels are closed together.

16. Apparatus as claimed in claim 12, wherein the or each groove is associated with at least one set of latching posts, the or each set being constituted by two pairs of aligned latching posts and the two pairs of each set being positioned on opposite sides of the associated groove, the or each set of latching posts constituting optical fibre location means and being engageable in complementary sockets formed in the casing.

17. A jointing enclosure comprising a fibre tray, a plurality of optical fibres, and optical fibre handling apparatus as claimed in claim 12, wherein the base plate is fixed to the fibre tray beneath the optical fibres, with the or each groove transverse to the optical fibres.

18. Apparatus for handling an optical fibre, the apparatus comprising a casing defining a substantially light-proof enclosure surrounding an optical fibre operating position defined by a secondary waveguide which defines an optical waveguiding path, mechanical means for positioning an optical fibre in the operating position, whereby optical energy passing along the optical fibre is tapped into the optical waveguiding path, and an apertured support, the casing being provided with means for detachably locking the casing to the support so that the fibre operating position is aligned with the aperture.

19. An apparatus for measuring optical energy from an optical fibre comprising:
a housing,
a movable projection within said housing for positioning the optical fibre into a curved measurement position,
a secondary waveguide adjacent said curved measurement position receiving optical energy tapped out of said fibre and confining said energy into a curved optical path defined by said secondary waveguide; and
a detector adjacent one end of said secondary waveguide measuring the optical energy tapped out of said optical fibre.

20. An apparatus as in claim 19, further comprising an apertured support for said optical fibre, said housing detachably locking to said support so that said measurement position aligns with one or more of the apertures in said support.

21. A method of measuring optical energy from an optical fibre comprising the steps of:
bending the optical fibre into position adjacent a curved secondary waveguide,
applying optical energy to the optical fibre,
tapping optical energy out of said curved waveguide into the secondary waveguide, guiding the optical energy tapped from the fibre along the curved path defined by the secondary waveguide, and measuring optical energy tapped from the optical fibre to the secondary waveguide.

22. The method of measuring optical energy from an optical fibre according to claim 21, wherein the tapped optical energy in the secondary waveguide is guided along a path that is initially curved and subsequently straight.

* * * * *